United States Patent [19]

Vondracek

[11] Patent Number: 5,442,945
[45] Date of Patent: Aug. 22, 1995

[54] METHOD OF AND DEVICE FOR MANUFACTURING CURVED HELICAL SPRINGS

[75] Inventor: Hans Vondracek, Breckerfeld, Germany

[73] Assignee: Fried. Krupp AG Hoesch-Krupp, Dortmund, Germany

[21] Appl. No.: 85,816

[22] Filed: Jul. 28, 1993

[30] Foreign Application Priority Data

Jul. 29, 1992 [DE] Germany ................. 42 24 962.7

[51] Int. Cl.⁶ ............................................. B21F 3/10
[52] U.S. Cl. ........................................ 72/139; 72/142
[58] Field of Search .......................... 72/138, 139, 142

[56] References Cited

U.S. PATENT DOCUMENTS

| | | | |
|---|---|---|---|
| 287,827 | 11/1883 | Hall | 72/139 |
| 477,525 | 6/1892 | Ferrell | 72/139 |
| 2,335,423 | 11/1943 | Knoop | 72/139 |
| 3,000,427 | 9/1961 | Gogan | 72/142 |
| 3,225,579 | 12/1965 | Chombers | 72/142 |

FOREIGN PATENT DOCUMENTS

| | | | |
|---|---|---|---|
| 1263477 | 5/1961 | France | 72/142 |
| 0038267 | 3/1976 | Japan | 72/142 |

*Primary Examiner*—David Jones
*Attorney, Agent, or Firm*—Max Fogiel

[57] ABSTRACT

A method of manufacturing helical springs that are curved when unstressed from wire or rod heated to coiling temperature in one step. The spring is coiled on a mandrel that is curved to match the desired curvature of the finished spring.

7 Claims, 2 Drawing Sheets

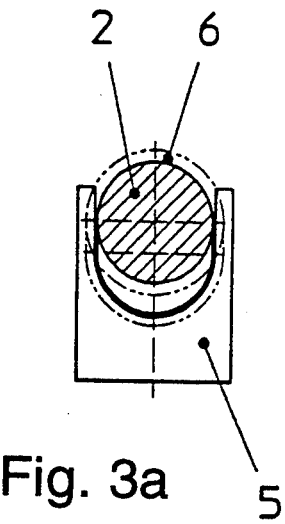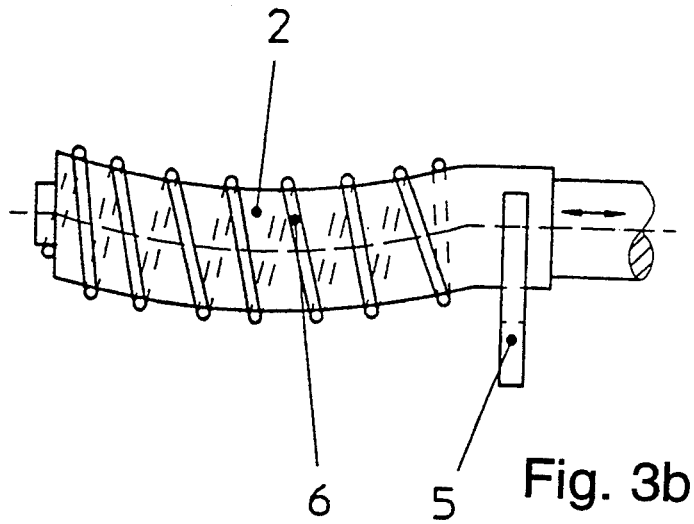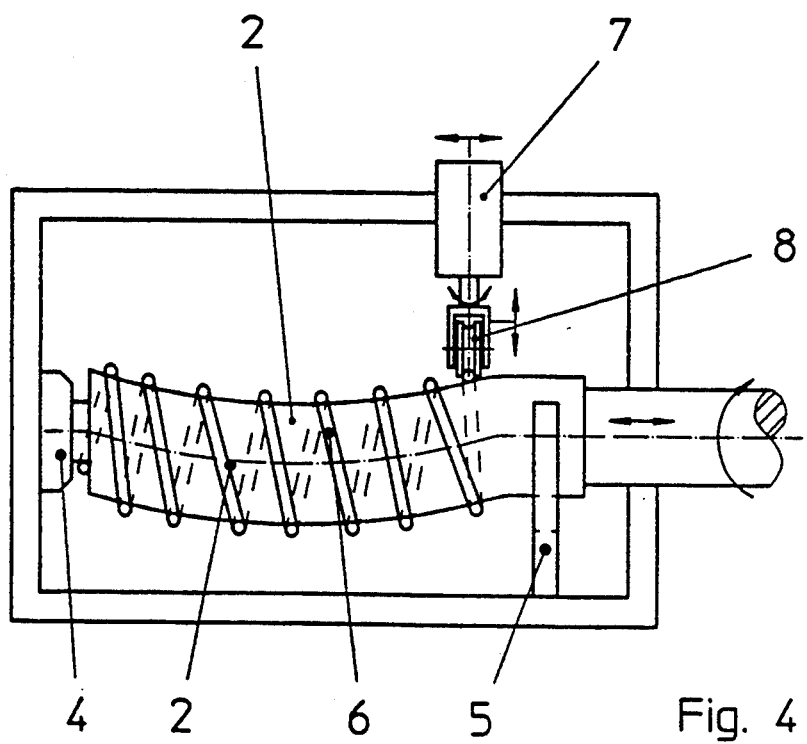

METHOD OF AND DEVICE FOR MANUFACTURING CURVED HELICAL SPRINGS

BACKGROUND OF THE INVENTION

Helical springs that are curved when unstressed are known from German Patents 1 505 616 and 3 743 450, for example. Springs of this type are employed to advantage in automotive-axle dashpots because they can be positioned with their curvature extensively compensating for undesirable friction and bending moments against the shock-absorber piston rod.

Curved helical springs have until now been manufactured only on cold-winding mechanism without mandrels as described for instance on pages 60 to 62 of Meissner and Wanke's "Handbuch Federn," Berlin, VEB Verlag Technik, 1988. This procedure achieves the desired curvature without the expense of varying every other winding flight.

Helical springs can in one particular alternative to winding without using mandrels be manufactured hot on what are called winding benches. They can be shaped by two parallel cylindrical rollers, one called the mandrel and the other the trainer. The training function can on the other hand be assumed by a computerized numerically controlled wire feed as described on pages 185 and 186 of the Hoesch Hohenlimburg AG literature "Warmgeformte Federn " issued on the occasion of the 52nd IAA in Frankfurt-am-Main in 1987 and on pages 106 and 107 of the Stahlwerke Brüninghaus GmbH literature "Technische Data Fahrzeugfedern" issued on the occasion of the 45th IAA in Frankfurt-am-Main in 1973.

A two-step method of manufacturing curved helical springs with existing production facilities (in-house state of the art) has been developed.

The first step comprises coiling a straight-cylindrical helical spring. The second step is to position it on a curved mandrel in a hardening press. The press is closed, curving the spring in conformity with the mandrel, and the spring is quenched in oil.

A substantial drawback of this two-stage method as compared to the method of manufacturing a straight spring is that it is more complicated and accordingly more expensive.

A method of manufacturing curved helical springs is known from German 4 124 326 C1. The curvature is obtained by incomplete cooling or heating of sections of the coil before or during setting.

Reproducible industrial-scale manufacture of curved helical springs by this known method extensively depends on local flow boundaries, which are directly determined by the spring's temper strength and local temperatures. It is accordingly necessary to achieve the desired curvature in addition to locally determined flow boundaries to apply tension during the setting process that precisely matches the particular cross-section or coil section. This would seem possible with today's demanding tolerances only with economically unjustified expenditures.

SUMMARY OF THE INVENTION

The objects of the present invention are accordingly a method and device of the aforesaid genus that will economically and reliably allow the manufacture of helical springs that curve when unstressed in a single-stage operation that allows for tolerances.

The advantages of the method and device in accordance with the invention are in particular that helical springs that curve when unstressed can be economically manufactured in a single-stage operation.

BRIEF DESCRIPTION OF THE DRAWINGS

The invention will now be specified with reference to embodiments illustrated by way of example in the schematic drawing, wherein FIG. 3a is a front view of and section through part of a coiling bench, FIG. 3b is a sectional end view of FIG. 3a, and FIG. 4 is a front view of another coiling bench.

DESCRIPTION OF THE PREFERRED EMBODIMENTS

Figure 1:
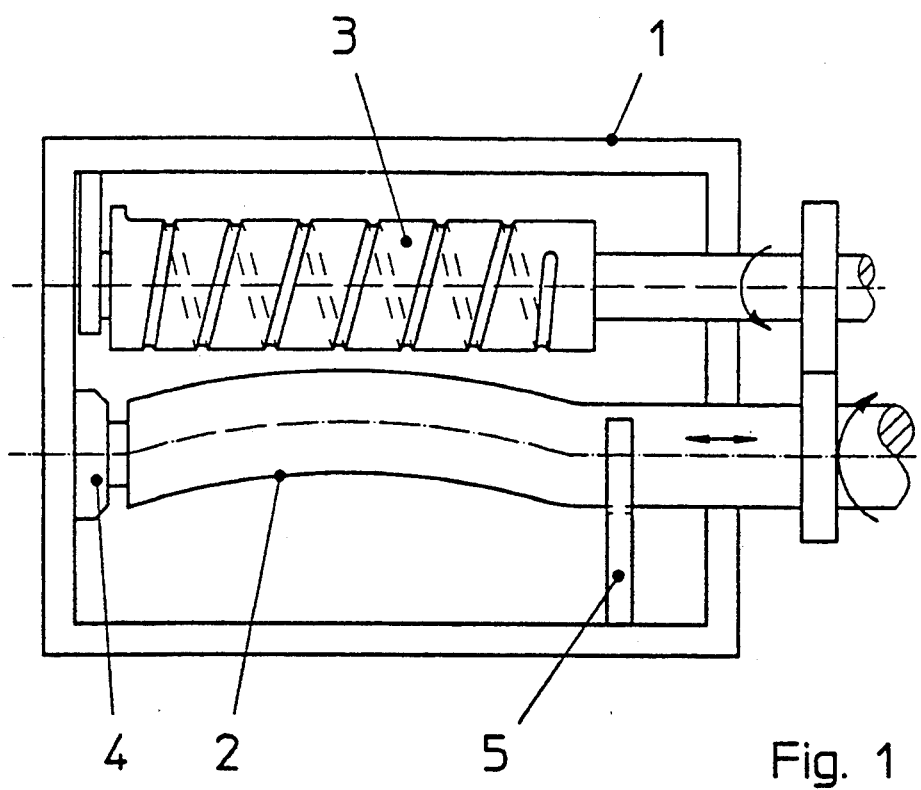
FIG. 1 is a front view of a coiling bench.

As will be evident from FIGS. 1 through 4, a coiling bench 1 for manufacturing curved helical springs 6 from unillustrated wire or rod heated to coiling temperature consists essentially of at least one mandrel 2, a feed roller 3 (FIGS. 1 & 2) or computerized numerical-controlled wire-or-rod feed 7 (FIG. 4), a mandrel lock 4, and a stripper 5. The mandrel or mandrels have the curve desired for the spring.

Figure 2:
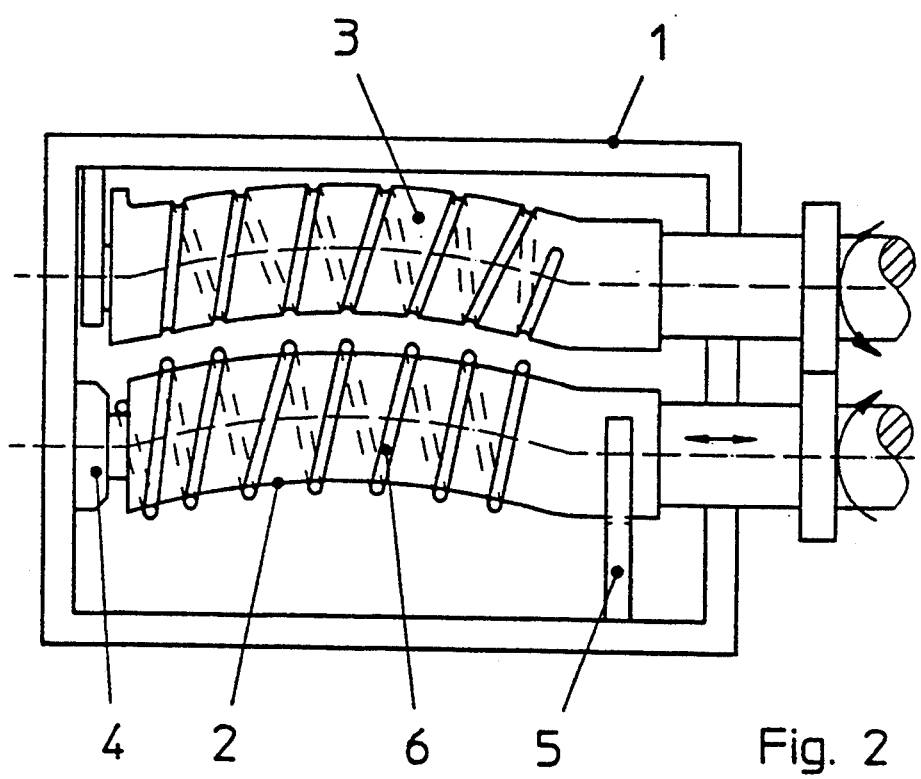
FIG. 2 is a front view of another type of coiling bench.

The feed roller 3 illustrated in FIG. 2 has a matching curve.

An unillustrated rod is secured in mandrel lock 4 and coiled tight around mandrel 2 by rotating it and feed roller 3 in opposite directions. To allow stripper 5 to strip the finished helical spring 6 from mandrel 2 along the level of curvature, the stripper intercepts only the coiled components of the spring that are next to and parallel with the level of curvature. Stripper 5 also has a recess along the direction of curvature that matches the depth of the curvature (FIG. 3).

FIG. 4 illustrates a coiling bench 1 with computerized numerical-controlled wire-or-rod feed 7. A narrow roller 8 fits around the wire or rod being coiled and axially follows the curve of mandrel 2.

I claim:

1. A method for manufacturing helical springs from wire or rod and having a curved longitudinal central axis when in an unstressed state, comprising the steps of: heating the wire or rod to coiling temperature; providing a mandrel having a curved longitudinal central axis corresponding in curvature to the curved longitudinal central axis of the finished spring; and coiling said wire or rod on said mandrel to form the finished spring with turns of substantially equal diameters.

2. Apparatus for manufacturing helical springs from wire or rod and having a curved longitudinal central axis when in an unstressed state, comprising the steps of: means for heating the wire or rod to coiling temperature; a mandrel having a curved longitudinal central axis corresponding in curvature to the curved longitudinal central axis of the finished spring; and means for coiling said wire or rod on said mandrel to form the finished spring with turns of substantially equal diameters; and-feed means extending along said longitudinal axis for feeding wire or rod to said mandrel.

3. Apparatus as defined in claim 2, wherein said coiling means comprises a bench.

4. Apparatus as defined in claim 2, including stripper means for removing the finished spring from said mandrel.

5. Apparatus as defined in claim 2, wherein said feed means comprises a feed roller.

6. Apparatus as defined in claim 5, wherein said feed roller has a curved longitudinal central axis corresponding in curvature to the curved longitudinal central axis of the finished spring.

7. Apparatus for manufacturing helical springs from wire or rod and having a curved longitudinal central axis when in an unstressed state, comprising the steps of: means for heating the wire or rod to coiling temperature; a mandrel having a curved longitudinal central axis corresponding in curvature to the curved longitudinal central axis of the finished spring; and means for coiling said wire or rod on said mandrel to form the finished spring with turns of substantially equal diameters; and feed means extending along said longitudinal axis for feeding wire or rod to said mandrel; said feed means comprising a numerically-controlled wire or rod feed for feeding wire or rod to said mandrel.

* * * * *